UNITED STATES PATENT OFFICE.

RUFUS S. MERRILL, OF CAMBRIDGE, MASS., ASSIGNOR, BY MESNE ASSIGNMENTS, TO WM. B. MERRILL, JOSHUA MERRILL, AND RUFUS S. MERRILL.

IMPROVEMENT IN BURNING HEAVY HYDROCARBON OILS FOR ILLUMINATION.

Specification forming part of Letters Patent No. 100,915, dated March 15, 1870; reissue No. 7,095, dated May 2, 1876; application filed March 8, 1876.

DIVISION A.

*To all whom it may concern:*

Be it known that I, RUFUS S. MERRILL, of Cambridge, in the county of Middlesex and State of Massachusetts, have invented a certain new and useful Method of Treating or Using Certain Heavy Oils obtained from the distillation of coal, petroleum, shale, schist, &c., for burning and illuminating purposes; and I hereby declare that the following is a full, clear, and exact description of the same.

It is well known to those skilled in the art of distilling petroleum and oil produced from coal, shale, and schist, that when either of these substances is subjected to distillation, a great difference exists in their respective boiling-points, and in the production of the various oils and spirits that come over during the process of distillation; and, first, there is always a considerable percentage of naphtha or volatile spirit, varying in gravity and boiling-point, some of it being so volatile that it is difficult to condense it by ordinary means. These spirits are termed "naphthas or benzoles," and usually embrace the portion coming over between 85° and 60° Baumé's scale. They are too light, volatile, and dangerous to be generally used for burning in lamps, and are principally used for paint, varnish making, and for carbureting atmospheric air for automatic gas-machines, the article so used being known as "gasoline."

After the naphthas have been distilled off down, say, to 60° Baumé, there begins to come over an oil more fixed in character and of higher boiling-point, which oil is used as an illuminating-oil, and is burned in lamps provided with flat or round wick kerosene-burners, and it constitutes from fifty to seventy per centum of the products of distillation. In other words, when the distillation is continued from 60° Baumé to about 40° Baumé the light thin oil that comes over between these degrees Baumé is about sixty per cent. of the petroleum from which the naphtha has been removed.

The petroleum which yields these products in the quantities stated is more particularly that obtained from the wells in Pennsylvania.

After the oil running from the condenser has reached about sixty per cent. of the oil put into the still, the oil begins to come over thicker in body, and it contains large quantities of paraffine; and, if the distillation be continued rapidly, this oil comes so heavy in gravity and thick in body that it is unsuitable to be mixed with the thin oils before named for burning purposes. When it is necessary to do so it is chilled and strained or pressed in suitable bags for the removal of the solid paraffine. In some cases it has been mixed with naphthas and again distilled, in order to make a cheap burning-oil; but such mixtures are poor in quality, and much more dangerous to burn in ordinary kerosene-lamps, the naphtha portion with which it is distilled combining with the heavy oil, being so volatile that when the lamps become heated they are set free and very liable to ignite, thus causing serious accidents to life and property.

Oils made from petroleum and coal, shale, and schist have been burned in argand and similar lamps when such oils have been so distilled as to simply remove those portions that are readily removed by steam, or by boiling water put in the still with the petroleum or coal-oil. The quantity removed usually varies from ten to fifteen per centum in coal and shale oil, and from fifteen to twenty-five per centum in petroleum-oil. When heated by steam—that is, by simply steaming the oil—the amount of light products that can be removed is, with coal and shale, from ten to fifteen per cent., and from petroleum, from fifteen to twenty-five per cent. The whole of the remaining portion of oil will burn poorly in argand or button lamps.

I am not aware that any attempt has ever been made to burn in lamps, and for illuminating purposes, the heavy oils—that is, oils which represent only the last twenty-five to forty per cent. of the distillates of coal, shale, and petroleum oils. The heavy oil is rich in carbon; but will not burn satisfactorily in the ordinary lamps, such as are used for burning kerosene-oil. It rapidly crusts the wick, and smokes so badly as to be impracticable as an illuminating material.

I have discovered that when that portion of the distillates of coal, shale, and petroleum oil heavier than 38° Baumé is collected in suitable tanks and is chilled, and the solid paraffine removed from it by well-known processes, (the oil, after chilling and pressing, usually weighs about from 28° to 36° Baumé at 60° Fahrenheit, and is heavy and oily in body, having also a very high distilling-point, nearly 600° Fahrenheit,) the oil so obtained can be burned continuously in a lamp and with a wick, and produce a brilliant, white, and beautiful flame under the following conditions combined, to wit: First, the oil must be maintained, while burning, at a temperature where it acquires sufficient fluidity to ascend the wick by its capillary action; second, the wick should be cylindrical, or so shaped as to produce a circular or otherwise equivalent flame, whether continuous or not; third, there must be an artificial draft, so as to supply atmospheric air to the flame, both internally and externally.

I do not, in this patent, claim any particular apparatus. Indeed, any lamp which is arranged so as to heat the burning material in its reservoir, whether by heat applied to the vessel from without or from within—*i. e.*, by transmission of the heat generated by the burner itself, and is provided with a round or equivalent wick-tube, and with appliances to produce an internal and external draft will, more or less, answer the purpose, according to the arrangement and particular adaptation of the devices for producing the functions described; nor do I claim in this patent that the means described are new in a lamp, either separately or combined; but what I have discovered is the new application of a known substance or material, (the oil,) or the application of a known substance or material to a new purpose; and also the new application of old means to an old substance to produce a new and beneficial result from it never heretofore attained. Thus, the burning of this oil, which has never been used for illuminating purposes in the old solar lamp, in which nothing but lard, or sperm, or whale oils were used, assuming that the solar lamps contain and embrace all the means to bring about the necessary conditions hereinbefore specified, is such a new application of a known substance, and also such a new application of old means, as constitutes my discovery, and is contemplated to be protected by this patent. Among other advantages attending the use of this oil as a burning-fluid is that it is so fixed, having an igniting-point about 300° Fahrenheit, that it is perfectly safe, and free from all danger of explosion, or such accidents as daily occur in the use of the light products known as kerosene. It is also economical, as it burns much longer than the same quantity of ordinary kerosene-oil.

In many States the use of kerosene-oil as an illuminating material is prohibited by law in railroad-cars, owing to its inflammable character, which, in case of accident to the cars, at once involves the passengers in great danger of being burned. The heavy oil described is so safe that it would not ignite any more than sperm or lard oil; and if the lamp should be thrown down in which it was burning, and the oil become spilled, it would not catch fire, but the flame would be immediately extinguished by the fall of the lamp.

Having thus fully described my discovery and the manner in which the same is or may be carried into effect, I would state my claim, as follows:

The burning, for illuminating purposes, and in the manner herein shown and set forth, of the herein described and referred-to latter products of distillation of coal, shale, and petroleum, known as heavy oil—that is to say, heating said oil, and drawing it up around the hollow or equivalently formed wick, and subjecting it, at the burning-point, to an artificial draft of atmospheric air, both within and without the wick.

In testimony whereof I have hereunto signed my name this 6th day of March A. D. 1876.

RUFUS S. MERRILL.

Witnesses:

JOSIAH DAVIDSON,

MARK HOLLINGSWORTH.